United States Patent
Yamada et al.

(10) Patent No.: US 12,448,556 B2
(45) Date of Patent: *Oct. 21, 2025

(54) METHOD OF PRODUCING COMPOSITE MATERIAL

(71) Applicant: NICHIA CORPORATION, Anan (JP)

(72) Inventors: Shoichi Yamada, Anan (JP); Takeshi Kihara, Tokushima (JP)

(73) Assignee: NICHIA CORPORATION, Anan (JP)

( * ) Notice: Subject to any disclaimer, the term of this patent is extended or adjusted under 35 U.S.C. 154(b) by 435 days.

This patent is subject to a terminal disclaimer.

(21) Appl. No.: 17/796,033

(22) PCT Filed: Jan. 25, 2021

(86) PCT No.: PCT/JP2021/002456
§ 371 (c)(1),
(2) Date: Jul. 28, 2022

(87) PCT Pub. No.: WO2021/153506
PCT Pub. Date: Aug. 5, 2021

(65) Prior Publication Data
US 2023/0086662 A1    Mar. 23, 2023

(30) Foreign Application Priority Data

Jan. 31, 2020    (JP) .................................. 2020-015338

(51) Int. Cl.
*B22F 1/05*    (2022.01)
*B22F 3/105*    (2006.01)
(Continued)

(52) U.S. Cl.
CPC .................. *C09K 5/14* (2013.01); *B22F 1/05* (2022.01); *B22F 3/105* (2013.01); *B22F 3/14* (2013.01);
(Continued)

(58) Field of Classification Search
CPC .............. B22F 3/105; B22F 2003/1051; B22F 2301/10; B22F 2302/406; C22C 26/00
See application file for complete search history.

(56) References Cited

U.S. PATENT DOCUMENTS 5,045,972 A * 9/1991 Supan ................. H01L 23/3732
419/48
6,001,304 A * 12/1999 Yoo ..................... C04B 35/6455
977/777
(Continued)

FOREIGN PATENT DOCUMENTS

EP    3 754 038 A1    12/2020
JP    H11-158568 A    6/1999
(Continued)

OTHER PUBLICATIONS

International Search Report with English translation and Written Opinion issued in the corresponding PCT Application No. PCT/JP2021/002456, dated Mar. 23, 2021; 8 pages.
(Continued)

*Primary Examiner* — Sally A Merkling
*Assistant Examiner* — Sean P. O'Keefe
(74) *Attorney, Agent, or Firm* — Foley & Lardner LLP

(57) ABSTRACT

A method of producing a composite material, the method including: preparing a mixed powder of diamond particles and copper powder particles; and generating a composite material containing diamond and copper from the mixed powder by pulsed electric current sintering with a pressure of 5 MPa or greater and 100 MPa or less applied to the mixed powder, and the mixed powder maintained at a temperature equal to or higher than 500° C. and lower than 800° C.

20 Claims, 8 Drawing Sheets

(51) Int. Cl.
*B22F 3/14* (2006.01)
*C09K 5/14* (2006.01)

(52) U.S. Cl.
CPC ... *B22F 2003/1051* (2013.01); *B22F 2301/10* (2013.01); *B22F 2302/406* (2013.01); *B22F 2304/10* (2013.01)

(56) References Cited

U.S. PATENT DOCUMENTS

| | | | |
|---|---|---|---|
| 11,799,065 B2 * | 10/2023 | Yamada | ............... H01L 33/641 |
| 2005/0051891 A1 | 3/2005 | Yoshida et al. | |
| 2011/0198771 A1 | 8/2011 | Hirotsuru et al. | |
| 2014/0321060 A1 | 10/2014 | Ishii et al. | |
| 2016/0336253 A1 * | 11/2016 | Fukui | ....................... B22F 7/04 |
| 2018/0328677 A1 | 11/2018 | Kim et al. | |

FOREIGN PATENT DOCUMENTS

| | | |
|---|---|---|
| JP | 2000-225549 A | 8/2000 |
| JP | 2004-175626 A | 6/2004 |
| JP | 2005-184021 A | 7/2005 |
| JP | 2008-248324 A | 10/2008 |
| JP | 2009-091605 A | 4/2009 |
| JP | 2013-115096 A | 6/2013 |
| JP | 2013-166982 A | 8/2013 |
| JP | 2014-214363 A | 11/2014 |
| JP | 2019-502251 A | 1/2019 |
| KR | 2120015 B1 * | 6/2020 ............. B22F 3/105 |
| WO | WO-03/040420 A1 | 5/2003 |
| WO | WO-2010/007974 A1 | 1/2010 |
| WO | WO-2011072961 A1 * | 6/2011 ............. B22F 3/105 |
| WO | WO-2016/056637 A1 | 4/2016 |
| WO | WO-2019/159694 A1 | 8/2019 |

OTHER PUBLICATIONS

Final Office Action on U.S. Appl. No. 17/161,305 dated Mar. 3, 2023.
Non-Final Office Action on U.S. Appl. No. 17/161,305 dated Nov. 15, 2022.
Notice of Allowance on U.S. Appl. No. 17/161,305 dated Jun. 28, 2023.
Rosinski, M., et al. "Synthesis and characterization of the diamond/copper composites produced by the pulse plasma sintering (PPS) method." Diamond and related materials 27 (2012): 29-35. (Year: 2012).

* cited by examiner

METHOD OF PRODUCING COMPOSITE MATERIAL

TECHNICAL FIELD

The present disclosure relates to methods of producing a composite material comprising diamond particles and copper (Cu).

BACKGROUND ART

With an increase in the light emission power of semiconductor light emitting devices, significance of heat dissipation from a semiconductor element has been increased. Significance of heat dissipation from a semiconductor element has been increased not only for semiconductor light emitting devices but also for semiconductor integrated circuit devices that execute computational processing at high speed, monolithic microwave integrated circuit devices that perform microwave oscillation, etc.

In order to dissipate heat from such a semiconductor device that generates heat during operation, heat dissipation members such as a heat dissipation substrate that dissipate heat from a semiconductor device have been studied. Heat dissipation members are demanded to have a high thermal conductivity. As a promising material for heat dissipation substrates, a composite material containing diamond and a metal has been studied.

Such a composite material has a structure in which particles of diamond, which has a higher thermal conductivity than those of metals, are dispersed in a metal such as Cu.

Patent Document No. 1 discloses an example in which a composite material containing diamond particles, chromium (Cr), and Cu is produced by pulsed electric current sintering at 800° C. or greater. Patent Document No. 2 discloses an example in which diamond particles are previously covered with Cu or aluminum (Al) and then the diamond particles are sintered by pulsed electric current sintering at 900° C. to produce a composite material.

CITATION LIST

Patent Literature

Patent Document No. 1: Japanese Patent Publication No. 2014-214363
Patent Document No. 2: Japanese Patent Publication No. 2008-248324

SUMMARY OF INVENTION

Technical Problem

The present disclosure provides a novel method of producing a composite material suitable for a heat dissipation member.

Solution to Problem

According to one embodiment, a method of producing a composite material, includes: preparing a mixed powder of diamond particles and copper powder particles; and generating a composite material containing diamond and copper from the mixed powder by pulsed electric current sintering with a pressure of 5 MPa or greater and 100 MPa or less applied to the mixed powder and with the mixed powder maintained at a temperature equal to or higher than 500° C. and lower than 800° C.

Advantageous Effects of Invention

According to certain embodiments of the present disclosure, a novel method of producing a composite material suitable for a heat dissipation member is provided.

DESCRIPTION OF EMBODIMENTS

Prior to the description of certain embodiments of the present disclosure, the present inventors' findings and the background thereof will be described.

Figure 1:
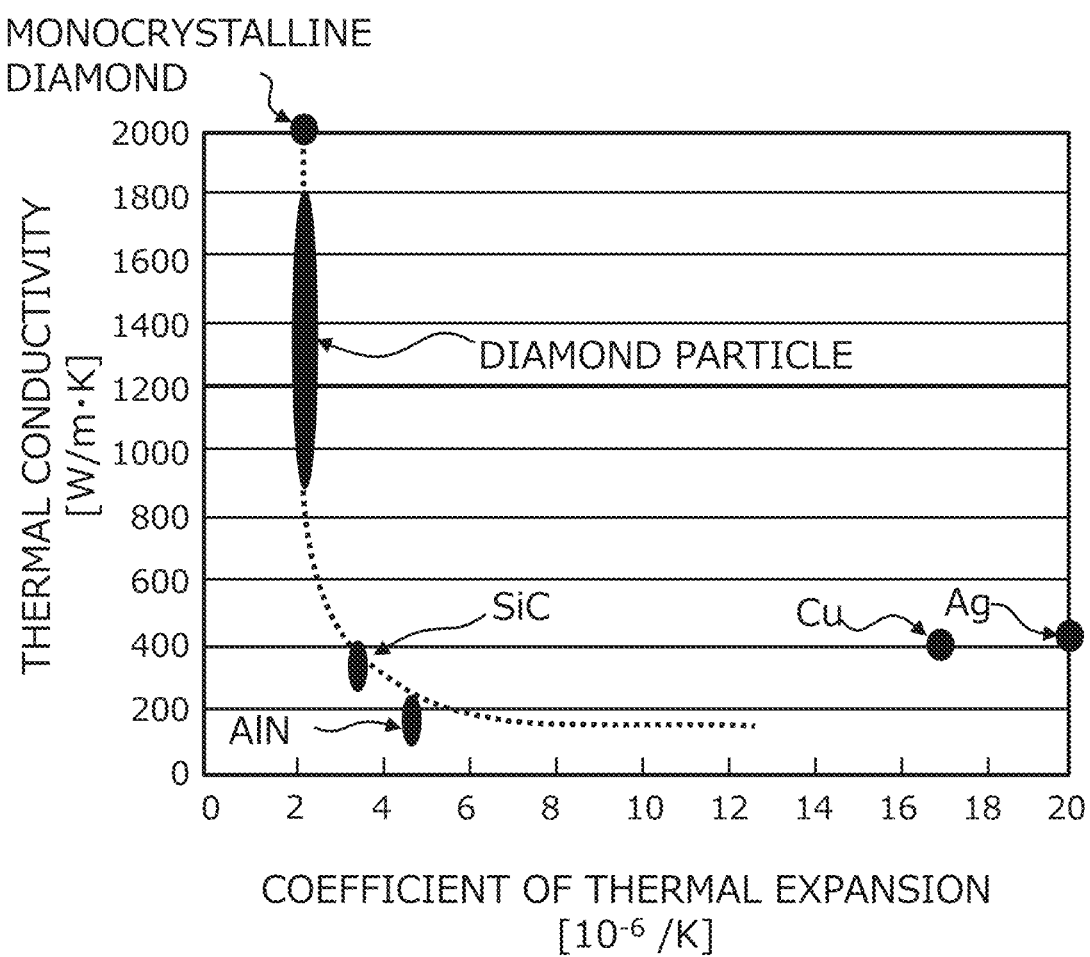
FIG. 1 is a graph in which coefficients of linear expansion and thermal conductivities of materials such as diamond and Cu are plotted.

FIG. 1 is a graph in which coefficients of linear expansion and thermal conductivities of materials such as diamond and Cu are plotted. In the graph, the horizontal axis represents coefficients of linear expansion, and the vertical axis represents thermal conductivities. The coefficient of linear expansion, which is a heat expansion rate per unit length, is expressed in units of $[10^{-6}/K]$. The thermal conductivity is expressed in units of [W/mK] (watt per meter per kelvin).

Single-crystalline diamond has a highest level of thermal conductivity among substances, which ideally exceeds 2000 [W/mK], which is very high. Poly-crystalline diamond particles have a thermal conductivity of, for example, in a range of about 900 to 1800 [W/mK]. Diamond particles produced using CVD have a thermal conductivity of, for example, in a range of about 900 to 1800 [W/mK].

Figure 2:
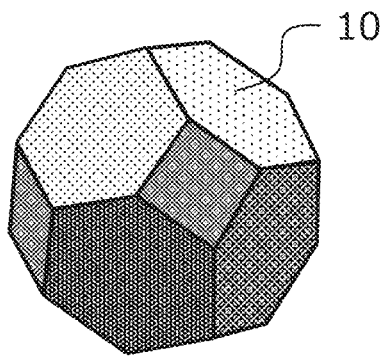
FIG. 2 is a perspective view schematically showing an example of a diamond particle.

FIG. 2 is a perspective view schematically showing an example diamond particle 10. The diamond particle 10 as shown in FIG. 2 is in the shape of, for example, a polyhedron having hexagonal and quadrangular faces (facets) at the surface thereof. Actual diamond particles may have more complicated and various shapes, e.g., additionally having other polygonal faces at the surface or being partially chipped. The thermal conductivities of individual diamond particles may have different values, depending on the presence of crystal defects, impurities, or the like at the surface or inside of the particle.

Cu and silver (Ag), which are metals, have a thermal conductivity of about 400 [W/mK] and about 420 [W/mK], respectively. Therefore, the thermal conductivity of a composite material in which diamond particles are dispersed in a metal such as Cu has an intermediate value between the thermal conductivities of the metal and the diamond particle. The greater the volume fraction of the diamond particles contained in the composite material is, the greater the theoretical value of the thermal conductivity of the composite material is. However, the actual thermal conductivity of the composite material is not determined only by the volume fraction of diamond, and is thought to be affected by the state of the interface between Cu and the diamond particle. The interface between Cu and diamond may be varied, depending on defects and damage or the like to diamond particles that may occur during a production process.

When a semiconductor device is used with a heat dissipation substrate joined thereto, then if there is a large difference in coefficient of linear expansion between the heat dissipation substrate and a member of the semiconductor device in contact with the heat dissipation substrate, e.g., detachment of the semiconductor device from the substrate may occur. Therefore, it is desirable that the coefficient of linear expansion of a composite material used in a heat dissipation substrate be similar to the coefficient of linear expansion of a member to be joined to the heat dissipation substrate.

The composite material comprising diamond particles and Cu has good characteristics, i.e., a thermal conductivity higher than that of Cu. A composite material containing a metal as a matrix may be called a metal matrix composite (may be referred to as MMC). Therefore, the composite material in which diamond particles are dispersed in Cu will be also herein referred to as a "Cu-diamond MMC." Alternatively, such a composite material will be also herein simply referred to as a "Cu diamond composite material" or "composite material."

Among the known techniques of producing a Cu-diamond MMC is "pulsed electric current sintering." Pulsed electric current sintering is described in detail below.

In general, it is known that thermal resistance or contact resistance increases at the interface between a diamond particle and Cu in Cu-diamond MMCs due to poor adhesion between Cu and diamond. It is has been thought that in order to increase the thermal conductivity of a Cu-diamond MMC, it is necessary to reduce thermal resistance at the interface between a diamond particle and Cu. Therefore, Patent Document Nos. 1 and 2 indicate that a composite material is obtained by pulsed electric current sintering performed at a temperature of as high as 800° C. or greater, or 900° C. or greater.

However, the present inventors' experiments and studies demonstrated that a Cu-diamond MMC having a high thermal conductivity can be obtained even in the case in which sintering temperature is maintained at lower than 800° C. during pulsed electric current sintering, which finding cannot be anticipated from conventional common technical knowledge.

A method of producing a composite material according to the present disclosure has been made based on the novel finding described above. Certain embodiments of the method of producing a composite material according to the present disclosure will be described below.

First Embodiment

Figure 3:
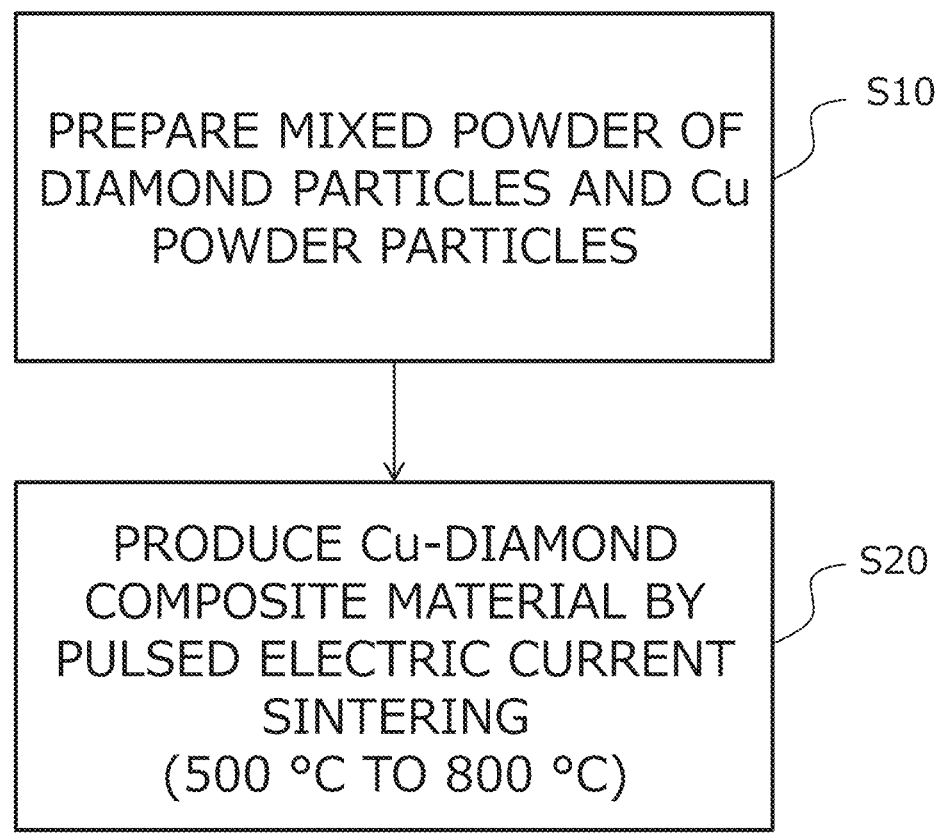
FIG. 3 is a flowchart showing main steps in a method of producing a Cu-diamond composite material in an embodiment of the present disclosure.

FIG. 3 is a flowchart showing main steps in a method of producing a Cu-diamond composite material according to an embodiment of the present disclosure. As shown in FIG. 3, the method of producing a composite material according to the present embodiment includes a step S10 of providing a mixed powder of diamond particles and Cu powder particles, and a step S20 of performing pulsed electric current sintering with a pressure of 5 MPa or greater and 100 MPa or less applied to the mixed powder and the temperature of the mixed powder maintained equal to or higher than 500° C. and lower than 800° C. to obtain a composite material comprising diamond and Cu from the mixed powder. A "temperature" as used herein refers to a temperature as measured directly or indirectly by, for example, a temperature measurement device, such as a radiation thermometer or thermocouple.

In the present disclosure, a "temperature" refers to a measured value of the temperature of a die 30 in a sintering device shown in FIG. 5 described below. A "sintering peak temperature Ts" in the description below refers to a temperature that is maintained at a predetermined pressure for a total of 1 minute or more, of the temperatures of the die 30 as measured by a radiation thermometer or thermocouple. For example, in the case of FIG. 6, the highest temperature that is maintained or holding in the sintering is referred to as a sintering peak temperature Ts, so to be distinguished from transient temperatures during a temperature rise period and a temperature fall period.

Figure 4:
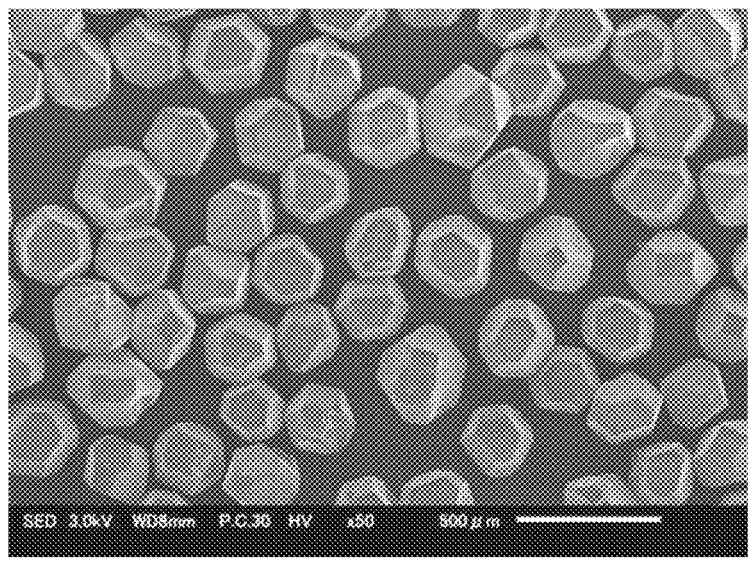
FIG. 4 is a photograph showing an example diamond particle contained in a mixed powder in an example of the present disclosure.

FIG. 4 is a photograph showing an example of the diamond particles contained in the mixed powder in step S10. In one embodiment, the diamond particles have an average particle size of 40 μm or greater and 500 μm or less. The particle size distribution of the diamond particles does not need to be a single-peak distribution having a single peak, and may have multiple peaks. With the average particle size of the diamond particles of 40 μm or greater, the Cu-diamond MMC can be produced at low cost, and the thermal conductivity thereof can be increased. With the average particle size of the diamond particles of 500 μm or less, the manufacturing cost of the diamond particles can be reduced. The particle size distribution of the diamond particles is preferably 200 μm or greater and 400 μm or less. Within this range, the thermal conductivity can be further improved. In one embodiment, the diamond particles in the mixed powder may include particles having an average particle size of 200 μm or greater and 400 μm or less, and particles having an average particle size of 40 μm or greater and 80 μm or less. In the present specification, particles having an average particle size of 200 μm or greater and 400

μm or less will be referred to as "large particles," and particles having an average particle size of 40 μm or greater and 80 μm or less will be referred to as "small particles." Particles having a relatively small average particle size can be dispersed to fill gaps between particles having a relatively large average particle size. Therefore, the contained amount of diamond, which has a higher thermal conductivity than that of Cu, can be increased. This allows for further improving the thermal conductivity of the Cu-diamond MMC. In the present specification, such a mixed powder having bimodality in a particle size distribution will be referred to as a "bimodal mixed powder." In a bimodal mixed powder, the proportion (mass fraction) of particles having an average particle size of 200 μm or greater and 400 μm or less to all of the diamond particles is preferably 50% or more. This is because the greater the average particle size is, the smaller the total surface area of the diamond particles is, and therefore, the smaller the contribution of thermal resistance at the interface between the diamond particle and Cu.

The average particle size of the Cu powder particles is, for example, 3 μm or greater and 10 μm or less. The Cu powder particles may contain a Cu fine powder having a particle size of 1 μm or less, which may be generated due to pulverization or the like. The Cu powder particle may contain incidental impurities. Impurities such as oxygen and nitrogen are desirably removed as much as possible, because such impurities lead to a reduction in thermal conductivity. For example, the amount of impurities contained in the Cu powder particle is preferably 2 mass % or less. Cu powder particles that are produced using a known method or that are commercially available may be used for such Cu powder particles.

An "average particle size" as used in the present disclosure refers to a "median diameter" in a particle size distribution as measured by a laser diffraction particle size distribution measurement device.

In the first embodiment of the present disclosure, a metal other than the Cu powder particle is intentionally not added in order to enhance wettability. Because Cu and diamond have poor wettability, it has been thought that the wettability needs to be improved by an additional metal. On the other hand, in the first embodiment of the present disclosure, such an additional metal is not required. By intentionally avoiding adding a metal other than the Cu powder particles, the inhibition of sintering can be reduced. In one embodiment, an amount of a metal or metals other than Cu in the mixed powder is 1% or less in mass fraction.

In order to, for example, improve the degree of adhesion between the diamond particle and Cu, the individual diamond particles may be covered with a metal layer of copper or the like as described above. However, in the first embodiment, the diamond particle is not covered with a metal layer. When the diamond particle is not covered with a metal layer of Cu or the like, the sintering enhancement of the diamond particle can be increased compared to the case in which the diamond particle is covered with a metal layer of Cu or the like. If the diamond particle is covered with a metal layer of Cu or the like, the sintering activity of the diamond particle decreases, and firing needs to be conducted at a high temperature as in the case in which a metal is added.

In this embodiment, a mass fraction of the Cu powder particles in the mixed powder is preferably, for example, 60% or greater and 85% or less, and a mass fraction of the diamond particles in the mixed powder is preferably, for example, 15% or greater and 40% or less. In other words, the mass ratio of the Cu powder particles and the diamond particles is selected within the range of 60:40 to 85:15, and is, for example, 80:20. The greater the mass fraction of the diamond particles is, the greater the thermal conductivity of the composite material is. With the mass fraction of the Cu powder particles of 60% or greater and 85% or less, a sufficient amount of copper is dispersed around diamond, and therefore, spaces or gaps that impede heat conduction are less likely to be generated in the Cu-diamond MMC. In other words, if the mass fraction of the Cu powder particles is within the range described above, Cu can have a volume that allows a sufficient amount of Cu to be dispersed around diamond, which can facilitate effectively filling a space between diamond particles with Cu. If the amount of Cu is excessively large, the thermal conductivity of Cu is lower than the thermal conductivity of diamond, which may result in decrease in the thermal conductivity of the Cu-diamond MMC. However, with the mass fraction of the Cu powder particles within the range described above, the Cu-diamond MMC can have a high thermal conductivity. In addition, as will be described below, experiments conducted by the present inventors demonstrated that even if the mass fraction of the diamond particles is the same, a higher thermal conductivity is likely to be obtained using a bimodal mixed powder.

Figure 5:
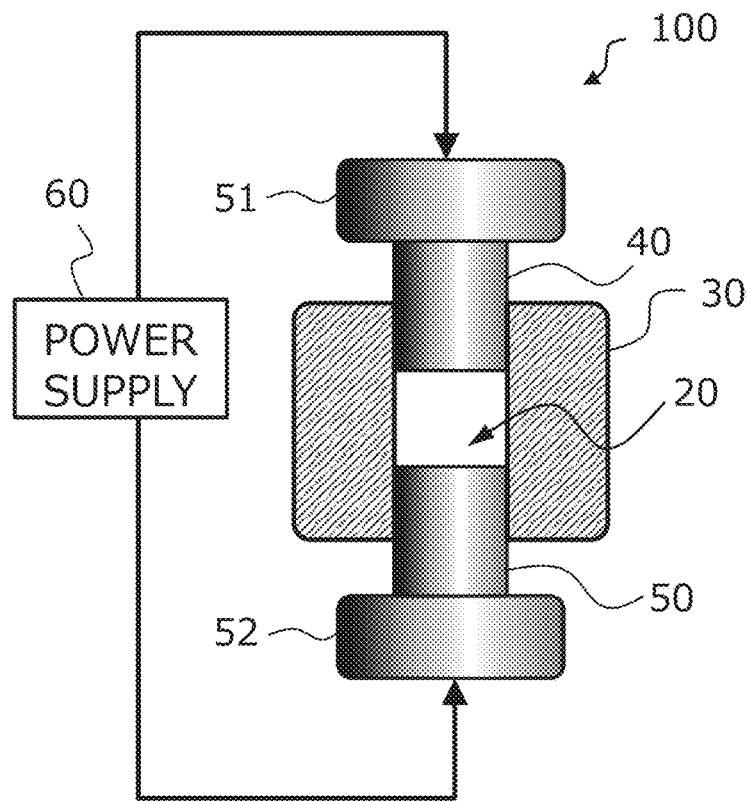
FIG. 5 is a schematic diagram showing an example configuration of a sintering device for use in pulsed electric current sintering in an embodiment of the present disclosure.

In the step S20, pulsed electric current sintering may be performed using, for example, a sintering device 100 shown in FIG. 5. Pulsed electric current sintering is also called spark plasma sintering (SPS). Therefore, the sintering device 100 of FIG. 5 will also be referred to as an "SPS device." The sintering device 100 in FIG. 5 is provided with a die 30 that defines a through hole forming a cavity 20, and an upper punch 40 and a lower punch 50 configured to be moved relatively upward and downward along the through hole of the die 30. The sintering device 100 in this example can perform sintering by utilizing self-heating under vertical uniaxial pressure. The upper punch 40 is electrically connected to a first electrode 51, and the lower punch 50 is electrically connected to a second electrode 52. The first electrode 51 and the second electrode 52 are electrically connected to a power supply unit 60.

The die 30 may be formed of a material having good heat resistance, such as graphite. The upper punch 40 and the lower punch 50 may be formed of a material having electrical conductivity and heat resistance, such as graphite. In measurement of thermal conductivity, the flatter the specimen is, the higher the reliability of measurement of thermal diffusivity is. Therefore, in the case in which it is difficult to ensure the flatness of a produced sintered body, a hard material is preferably inserted between the upper punch 40 and the specimen and between the lower punch 50 and the specimen so as to allow the sintered body to have flat surfaces. The hard material is preferably a cemented carbide, such as tungsten carbide (WC) or titanium carbide (TiC). The material for the upper punch 40 and the lower punch 50 may be changed to the above-mentioned material. The cavity 20 is a space defined by an inner wall surface defining the through hole of the die 30, a lower end surface of the upper punch 40, and an upper end surface of the lower punch 50. The above mixed powder is placed in the inside of the cavity 20. At least one of the upper punch 40 and the lower punch 50 is moved vertically so that the interval between the upper punch 40 and the lower punch 50 is reduced, and a pressure is thereby applied to the mixed powder in the cavity 20. The upper punch 40 and the lower punch 50 are driven by, for example, a hydraulic device (not shown). The pressure applied to the mixed powder in the cavity 20 may be adjusted to an appropriate value within the range of, for example, 5 MPa or greater and 100 MPa or less.

In pulsed electric current sintering, a pulsed electric current is passed between the upper punch 40 and the lower punch 50 by the sintering device 100 with a pressure applied to the mixed powder. The passage of a pulsed electric current is performed by repeatedly applying a pulsed DC power from the power supply unit 60 between the first electrode 51 and the second electrode 52. In the mixed powder pressurized by the upper punch 40 and the lower punch 50, Cu powder particles are in contact with each other, and therefore, a large number of local current paths are formed in the mixed powder, which allows the passage of an electric current. Such passage of a pulsed electric current generates Joule heat, which causes the temperature of the mixed powder to increase to a predetermined sintering temperature.

Figure 6:
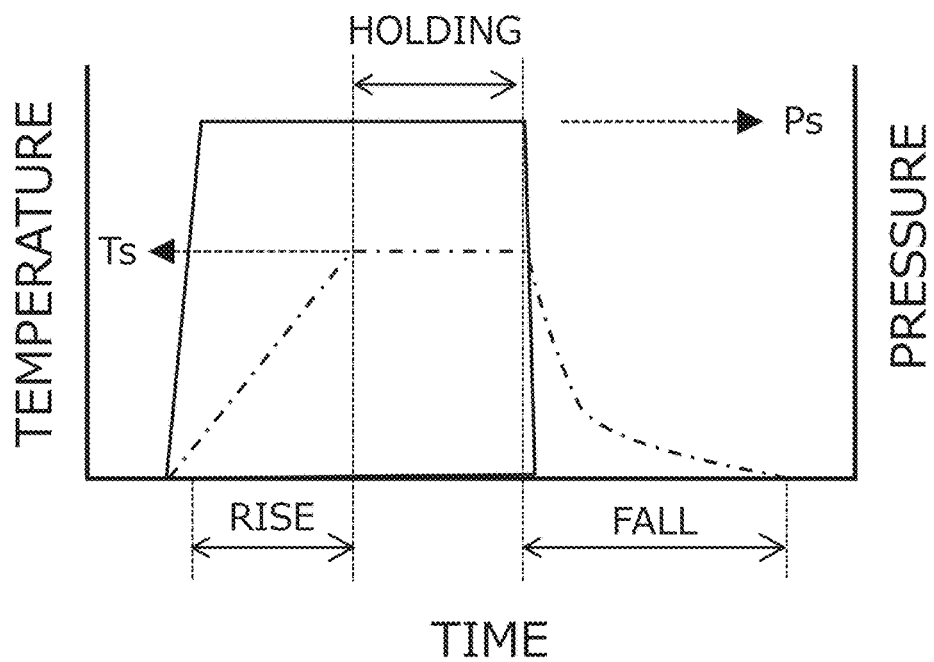
FIG. 6 is a diagram schematically showing an example relationship between a temperature and pressure of a mixed powder, and an elapsed time during a period of time from the start to end of a pulsed electric current sintering step.

FIG. 6 is a diagram schematically showing an example of how the temperature and pressure of the mixed powder change with time during a period of time from the start to end of the pulsed electric current sintering step. The temperature is indicated by a dash-dot line, and the pressure is indicated by a solid line. The horizontal axis represents time, the left vertical axis represents temperature, and the right vertical axis represents pressure. With the movement of the upper punch 40 and/or the lower punch 50, the pressure reaches a sintering pressure Ps in, for example, several seconds, and the sintering pressure Ps is maintained for, for example, 60 to 1800 seconds. After the start of passage of a pulsed electric current, the temperature of the mixed powder increases at a rate of, for example, 10 to 150 [° C./min] or more. After the temperature has reached a predetermined sintering peak temperature Ts, the voltage application conditions for the passage of a pulsed electric current are adjusted so as to maintain the sintering peak temperature Ts within the range of ±5° C. from a target temperature. The control of the sintering temperature can be performed through measurement feedback from a temperature measurement device attached to the die 30 of FIG. 5.

After a predetermined sintering time has passed and thus a composite material has been produced from the mixed powder, the passage of a pulsed electric current is stopped, and the temperature starts decreasing. In addition, the upper punch 40 and/or the lower punch 50 are moved to stop the application of a pressure to the composite material. After the temperature of the composite material has been sufficiently cooled to, for example, equal to or lower than 50° C., the composite material is removed from the die 30.

FIG. 6 shows that the temperature and pressure increase and plateau linearly with time, for the sake of simplicity. The transition in the actual temperature and pressure may include slight overshoots, curved changes, small fluctuations, and the like.

In this embodiment, in order to maintain the sintering temperature, the voltage is adjusted within the range of 1.0 V or greater and 3.0 V or less, and the pulsed electric current is adjusted within the range of 400 A or greater and 800 A or less. The pulsed electric current has a duty ratio of, for example, 10 to 80%, and a pulse width of, for example, 1 to 500 milliseconds. After the predetermined sintering peak temperature Ts has been maintained for a predetermined period of time, the passage of the pulsed electric current is stopped. These values are varied depending on various conditions such as the weight of the mixed powder, the sintering temperature, the material for the punches, etc., and therefore, are not limited to the ranges described above and can be changed if necessary.

In the case in which the sintering temperature is set to, for example, 600° C., the time it takes to reach from room temperature to the sintering temperature is, for example, several minutes to about 20 minutes. The cavity 20 is located in a reduced-pressure chamber (not shown). The ambient pressure in the reduced-pressure chamber is, for example, 100 Pa or less. Thus, the powder particles can be substantially prevented from being oxidized or nitrided during the sintering step performed by the passage of a pulsed electric current.

The sintering peak temperature Ts in an embodiment of the present disclosure is equal to or higher than 500° C. and lower than 800° C. as described above. Within this range, a Cu-diamond MMC having good thermal conductivity can be produced. The sintering peak temperature Ts is preferably 500° C. or greater and 750° C. or less, more preferably 550° C. or greater and 700° C. or less, and particularly preferably 600° C. or greater and 700° C. or less. Within these ranges, a Cu-diamond MMC having better thermal conductivity can be obtained. The sintering time, which also depends on the sintering peak temperature Ts, is, for example, 1 minute or more and 30 minutes or less. In the case in which the sintering peak temperature Ts is, for example, 550° C. or greater and 650° C. or less, the sintering time may be 5 minutes or more and 20 minutes or less, e.g., about 10 minutes.

The pressure applied to the mixed powder at the sintering peak temperature Ts is 5 MPa or more and 100 MPa or less, provided that the pressure is maintained constant. With the applied pressure of 5 MPa or more and 100 MPa or less, a Cu-diamond MMC having good thermal conductivity can be produced. The pressure range is preferably 10 MPa or greater and 90 MPa or less, more preferably 20 MPa or greater and 90 MPa or less, even more preferably 25 MPa or greater and 75 MPa or less, and particularly preferably 25 MPa or greater and 50 MPa or less. Within these pressure ranges, a Cu-diamond MMC having good thermal conductivity can be produced. Applying a constant pressure at the sintering peak temperature Ts as described above is herein referred to as "continuous pressurization."

Although an example in which continuous pressurization is used has been described above, the pressure does not need to be constant. The applied pressure may be increased or decreased in a stepwise or continuous manner, depending on how much sintering has proceeded.

Figure 7:
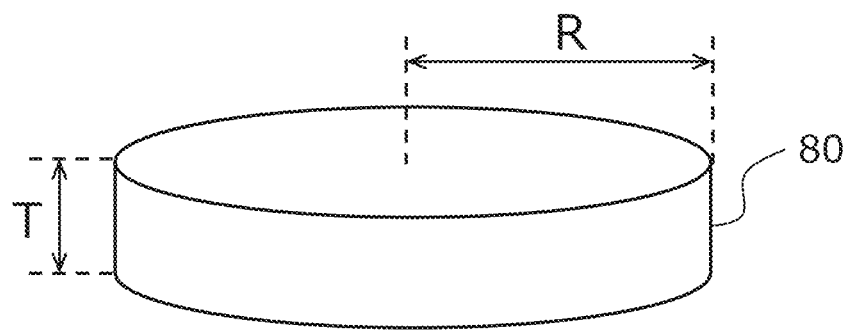
FIG. 7 is a perspective view schematically showing an outer shape of a composite material produced according to an embodiment of the present disclosure.

FIG. 7 is a perspective view schematically showing an example outer shape of a composite material 80 produced according to the present embodiment. In this example, the composite material 80 is in a disc-like shape having a thickness of T [mm] and a radius of R [mm]. The thickness T is, for example, 0.2 mm or greater and 20.0 mm or less. The radius R is, for example, 3 mm or greater and 300 mm or less. The composite material 80 immediately after sintering may not have a disc-like shape, and may be in a cuboid shape or other polyhedral shape, and may have stripe grooves or a regular protrusion-and-recess pattern at a surface thereof. A shape of the composite material 80 immediately after sintering as viewed from above is defined by the shape of a cross-section thereof taken perpendicularly to an axial direction of the cavity 20 of FIG. 5. For example, in the case in which the die 30 of FIG. 5 has a prism-shaped through hole, and the lower end surface of the upper punch 40 and the upper end surface of the lower punch 50 are a flat rectangular surface, the composite material 80 taken out from the sintering device 100 may be in a rectangular thin plate shape in a top view. After being taken out from the sintering device 100, the composite material 80 may be subjected to a treatment including mechanical processing such as cutting or polishing, or laser processing. A single composite material 80 may be separated into a plurality of individual heat dissipation members.

Figure 8:
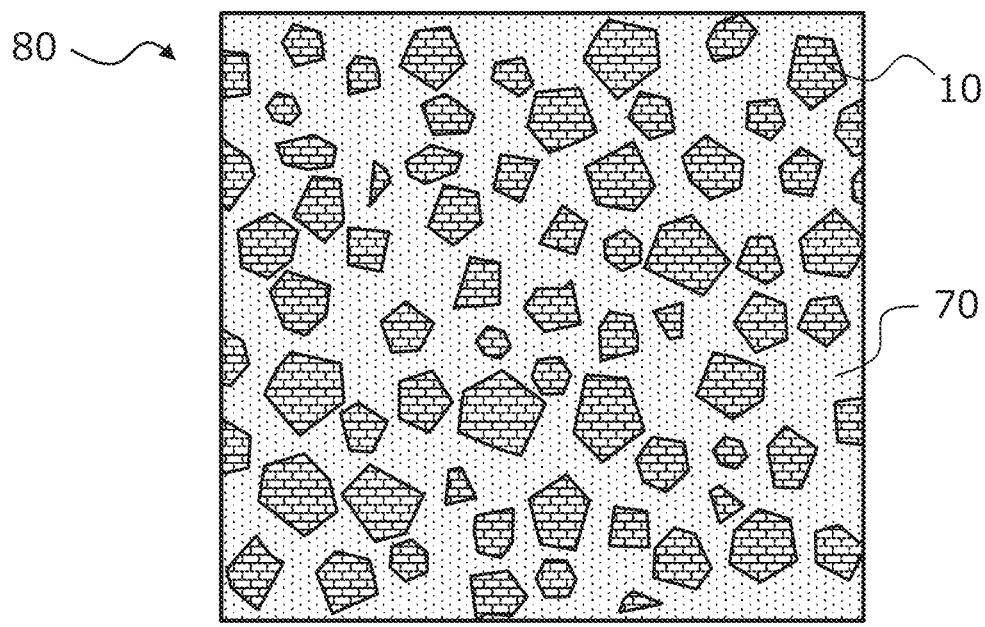
FIG. 8 is an enlarged cross-sectional view schematically showing a portion of a composite material produced according to an embodiment of the present disclosure.

FIG. 8 is a schematic enlarged view showing a portion of a cross-section of the composite material 80 thus produced. FIG. 8 is based on cross-sectional observation using an optical microscope or a scanning electron microscope (SEM). The composite material 80 shown in FIG. 8 contains Cu 70 as a metal matrix, and a large number of diamond particles 10 dispersed in the Cu 70. The Cu 70 is a metal body in which the Cu powder particles included in the mixed powder are sintered to be integrated together by the passage of a pulsed electric current. The individual diamond particles 10 contained in the composite material 80 are those originally included in the mixed powder. While the diamond particle 10 may be partially chipped in the pulsed electric current sintering step, a plurality of diamond particles are not joined together to grow into a new single particle.

According to the first embodiment, a Cu-diamond composite material is produced at a low temperature compared to conventional techniques, which allows for obtaining a Cu-diamond composite material having a thermal conductivity of, for example, 460 [W/mK] or more. Furthermore, a composite material having a thermal conductivity of 500 [W/mK] or more can be obtained. Furthermore, a composite material having a thermal conductivity of 600 [W/mK], preferably 690-710 [W/mK] or more, can be obtained. This is thought to be attributed to that setting the sintering temperature to be lower than that which is conventionally considered to be necessary allows for reducing or avoiding a degradation in thermal conductivity of diamond particles or a Cu-diamond interface that may occur during high-temperature sintering.

According to the first embodiment, a difference in temperature from pulsed electric current sintering to when the Cu-diamond MMC has been cooled to room temperature is small compared to conventional techniques. The amount of expansion and contraction of each of copper and diamond depending on a difference in coefficient of linear expansion therebetween in the first embodiment is small compared to that in conventional techniques. Thus, copper and diamond are less likely to be separated from each other due to the difference in coefficient of linear expansion, which allows decrease in thermal conductivity.

Second Embodiment

In a second embodiment, an effect similar to that of the first embodiment can be obtained. A method of producing a composite material according to the second embodiment has substantially the same features as those described in the first embodiment, except for the features described below.

Figure 9A:
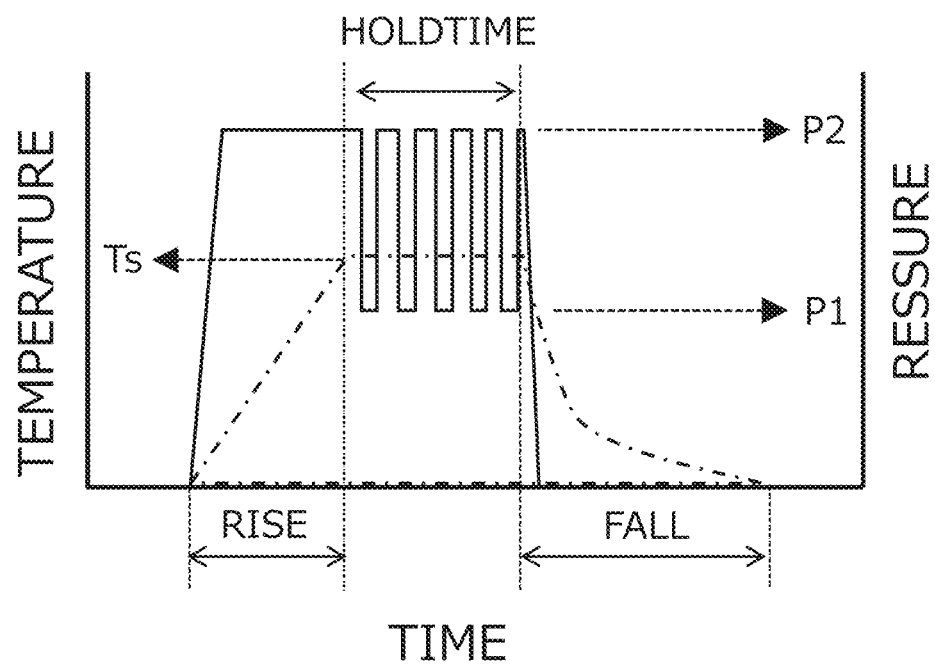
FIG. 9A is a diagram schematically showing another example relationship between a temperature and pressure of a mixed powder, and an elapsed time during a period of time from the start to end of a pulsed electric current sintering step.

The method of producing a composite material according to the second embodiment is different from that of the first embodiment in the technique of applying a pressure during pulsed electric current sintering. In the second embodiment, the pressure applied to the mixed powder of diamond particles and Cu powder particles does not need to be constant. As shown in FIG. 9A, a first pressure and a second pressure higher than the first pressure may be repeatedly applied to the mixed powder while the passage of a pulsed electric current is performed. Such a pressurization mode will be hereinafter referred to as "cyclic pressurization."

Figure 9B:
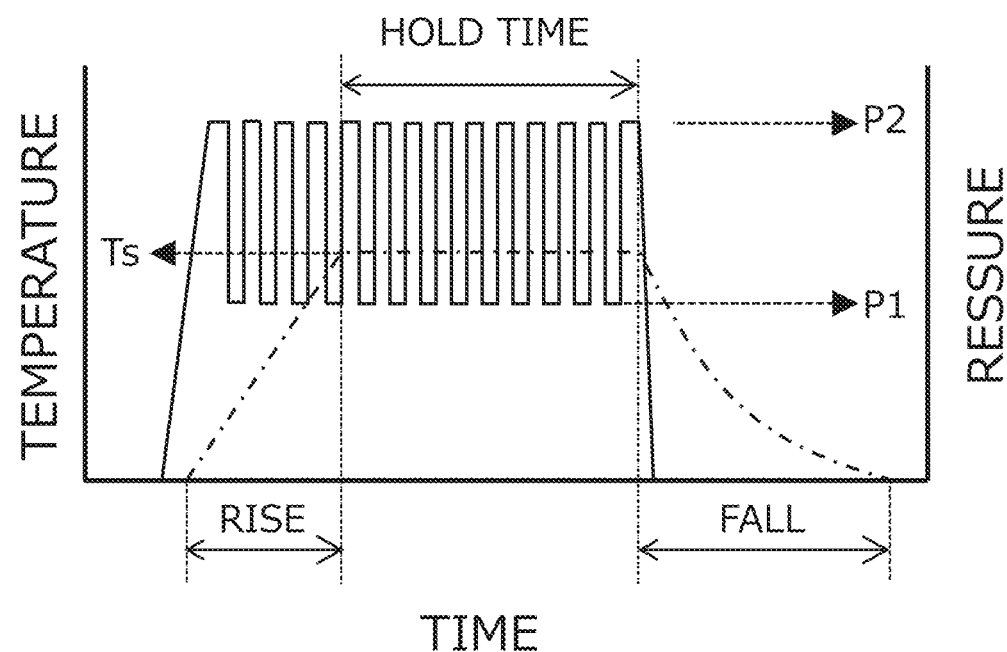
FIG. 9B is a diagram schematically showing another example relationship between a temperature and pressure of a mixed powder, and an elapsed time during a period of time from the start to end of a pulsed electric current sintering step.

FIG. 9B is a diagram showing another example of "cyclic pressurization" during sintering. As shown in FIG. 9B, a first pressure and a second pressure greater than the first pressure may be repeatedly applied to the mixed powder from the temperature rise period. In addition, the first and second pressures can also be repeatedly applied during the time that the sintering peak temperature Ts is maintained.

As described above, by the cyclic pressurization, in which a first pressure and a second pressure higher than the first pressure are repeatedly applied, a Cu-diamond MMC having a high thermal conductivity can be produced. This is thought to be attributed to, for example, a mechanism described as follows.

There is a difference in absolute value between the first pressure and the second pressure. In repetitive application of the first and second pressures, the first pressure is applied after the second pressure is applied. At this time, the relatively high pressure and then the relatively low pressure are applied, and therefore, the degree of freedom of the diamond particles in the die is higher when the first pressure is applied than when the second pressure is applied. This is thought to allow the arrangement of the diamond particles or the state of the interface between Cu and the diamond particles to be more advantageous in terms of heat conduction.

It is also likely that oxygen which is present in the surface of Cu and impedes heat conduction is removed. This is thought to result in improvement in the thermal diffusivity of a Cu-diamond MMC produced by cyclic pressurization compared to the case in which only the first pressure is applied, which increase thermal conductivity.

The pressures applied to the mixture of the diamond particles and the Cu powder particles, i.e., the first and second pressures, can be set within the range of 5 MPa or greater and 100 MPa or less, such that the second pressure is greater than the first pressure. The first pressure may be 5 MPa or greater and 60 MPa or less, and the second pressure may be 20 MPa or greater and 100 MPa or less. Preferably, the first pressure may be equal to or more than 5 MPa and less than 20 MPa, and the second pressure may be equal to or more than 20 MPa and less than or equal to 40 MPa. If the first and second pressures are within the above respective ranges, the thermal conductivity can be further improved.

Example 1

Cu powder particles having an average particle size of 5 μm and diamond particles having an average particle size of 250 μm were mixed together to obtain a mixed powder. The total weight of the mixed powder was 6.24 grams. The entire mixed powder contained 80 percent by mass of the Cu powder particles, and 20 percent by mass of the diamond particles. Next, a Cu-diamond MMC having a thickness of 3 mm was prepared using a sintering device (model: SPS-515S) manufactured by SPS Syntex, Inc. The sintering peak temperature Ts was 500° C., and the applied pressure was 36 MPa. The sintering peak temperature Ts was maintained for 10 minutes. The degree of vacuum at the start of sintering was 10 Pa. The magnitudes of a voltage and a current during sintering are varied, depending on the weight and thickness of a sample, a target sintering peak temperature Ts, and the like. In examples and comparative examples, the current value was within the range of 350 A or more and 700 A or less while the sintering peak temperature Ts is maintained. The applied voltage had a pulse width of 3.3 milliseconds.

Examples 2 to 12

In Examples 2 to 12, Cu-diamond MMCs were obtained in such a manner that only the sintering temperature, or both of the sintering peak temperature Ts and the applied pressure, were changed with respect to Example 1, as shown in Table 1 below. In Example 6, the average particle size of diamond was also changed to 60 μm. Also, in Example 9, diamond particles were a bimodal mixed powder. The Cu-diamond MMCs contained 10 percent by mass of diamond particles having an average particle size of 60 μm, and 20 percent by mass of diamond particles having an average particle size of 250 μm, with respect to the entire Cu-diamond MMCs.

Comparative Examples 1 to 4

In Comparative examples 1 to 4, Cu-diamond MMCs were obtained in such a manner that only the sintering temperature, or both of the sintering peak temperature Ts and the peak pressure, were changed as shown in Table 1.
Thermal Conductivity The thermal conductivity was estimated for each of the examples and comparative examples. The thermal conductivity can be calculated by the product of the specific heat, density, and thermal diffusivity. Specifically, the thermal conductivity is represented by the following expression.

Thermal conductivity[W/m·K]=thermal diffusivity [m$^2$/sec]×specific heat[J/K·kg]×density[kg/m$^3$]

The specific heat was calculated by weighting the literature values of the specific heats of diamond and Cu by the respective mass fractions in the mixture for each of the examples and comparative examples. The density was measured by Archimedes' technique. The thermal diffusivity was determined by a flash technique with a xenon lamp using a measurement device (model: LFA-447) manufactured by Netzsch Japan K. K. The measurement temperature was 25° C. During the measurement, the Cu-diamond MMCs had a thickness of 3 mm. The "thermal conductivity" in Table 1 was an estimated value from these literature values and the measured values.

temperature maintained equal to or higher than 500° C. and lower than 800° C., to obtain a composite material from the mixed powder. The composite materials thus obtained in Examples 1 to 12 had a higher thermal conductivity than that of all of those obtained in Comparative examples 1 to 4. For example, in Comparative example 4, although a pressure highest of all of the examples was applied, the thermal conductivity was reduced. In general, it is thought that an increased pressure results in a denser composite material. However, the present experiments demonstrated that a high pressure exceeding 100 MPa results in a decrease in thermal conductivity.

There is a difference in the average particle size of diamond included in a Cu-diamond MMC between Example 5 and Example 6. The Cu-diamond MMC of Example 5 had a higher thermal conductivity than that of the Cu-diamond MMC of Example 6.

The composite material of Example 9 had a higher thermal conductivity than that of the composite material of Example 10. The composite material of Example 9 contained diamond particles having an average particle size of 60 μm and diamond particles having an average particle size of 250 μm, and therefore, the proportion of diamond particles with respect to the composite material was greater than that of Example 10, in which only diamond particles having an average particle size of 250 μm are contained.

Example 13

A composite material was obtained in a manner as in Example 1, except for the differences described below. A first pressure and a second pressure were repeatedly applied, where the first pressure was 10 MPa, the second pressure was 36 MPa, and the sintering temperature was 600° C. The

TABLE 1

| | Experimental conditions | | | | | | Result |
|---|---|---|---|---|---|---|---|
| | | | Average particle sizes (μm) | | Mass fractions (mass %) | | |
| | Sintering temperature (° C.) | Pressure (MPa) | Small diamond particles | Large diamond particles | Cu | Small diamond particles | Large diamond particles | Thermal conductivity (W/m · K) |
| Ex. 1 | 500 | 36 | | 250 | 80 | | 20 | 586.3 |
| Ex. 2 | 550 | 36 | | 250 | 80 | | 20 | 618.0 |
| Ex. 3 | 600 | 10 | | 250 | 80 | | 20 | 496.8 |
| Ex. 4 | 600 | 20 | | 250 | 80 | | 20 | 606.5 |
| Ex. 5 | 600 | 36 | | 250 | 80 | | 20 | 625.7 |
| Ex. 6 | 600 | 36 | 60 | | 80 | 20 | | 577.5 |
| Ex. 7 | 600 | 50 | | 250 | 80 | | 20 | 619.9 |
| Ex. 8 | 600 | 90 | | 250 | 80 | | 20 | 532.2 |
| Ex. 9 | 640 | 36 | 60 | 250 | 70 | 10 | 20 | 672.1 |
| Ex. 10 | 650 | 36 | | 250 | 80 | | 20 | 609.1 |
| Ex. 11 | 700 | 36 | | 250 | 80 | | 20 | 504.8 |
| Ex. 12 | 750 | 36 | | 250 | 80 | | 20 | 486.2 |
| C. ex. 1 | 450 | 36 | | 250 | 80 | | 20 | 403.5 |
| C. ex. 2 | 800 | 36 | | 250 | 80 | | 20 | 451.4 |
| C. ex. 3 | 600 | 0 | | 250 | 80 | | 20 | 201.0 |
| C. ex. 4 | 700 | 300 | | 250 | 80 | | 20 | 375.2 |

Note)
Ex. is the abbreviation of Example. C. ex. is the abbreviation of Comparative example.

A mixed powder of diamond particles and Cu powder particles was prepared, and pulsed electric current sintering was performed on the mixed powder with a pressure of 5 MPa or greater and 100 MPa or less applied thereto and the application of the first pressure was maintained for 15 seconds, the application of the second pressure was maintained for 20 seconds, and the sum of times it took to change the pressures was 50 seconds. The total time of a single cycle was 85 seconds. The number of cycles performed was 25. The sintering peak temperature Ts was maintained for 20 minutes.

Examples 14 to 16

Cu-diamond MMCs were obtained under different conditions as shown in Table 2.
Thermal Conductivity The thermal conductivity of a Cu-diamond MMC was estimated for each of Examples 13 to 16 in a manner as in Example 1. The results are shown in Table 2. In Table 2, the results of Examples 3, 5, and 9 are also shown.

TABLE 2

| | Experimental conditions | | | | | | | | | Result |
|---|---|---|---|---|---|---|---|---|---|---|
| | | | | Average particle sizes (μm) | | | Mass fractions (mass %) | | | |
| | Sintering | Pressures (MPa) | | Small | Large | | Small | Large | | Thermal |
| | temperature (° C.) | First pressure | Second pressure | diamond particles | diamond particles | Cu | diamond particles | diamond particles | Pressurization technique | conductivity (W/m · K) |
| Ex. 13 | 600 | 10 | 36 | | 250 | 80 | | 20 | Cyclic pressurization | 639.4 |
| Ex. 14 | 640 | 10 | 36 | 60 | 250 | 70 | 10 | 20 | | 702.7 |
| Ex. 15 | 660 | 10 | 36 | 60 | 250 | 65 | 15 | 20 | | 673.2 |
| Ex. 16 | 640 | 50 | 90 | 60 | 250 | 70 | 10 | 20 | | 606.4 |
| Ex. 3 | 600 | 10 | | | 250 | 80 | | 20 | Continuous pressurization | 496.8 |
| Ex. 5 | 600 | 36 | | | 250 | 80 | | 20 | | 625.7 |
| Ex. 9 | 640 | 36 | | 60 | 250 | 70 | 10 | 20 | | 672.1 |

A mixed powder of diamond particles and Cu powder particles was prepared, and pulsed electric current sintering was performed on the mixed powder with a pressure of 5 MPa or greater and 100 MPa or less applied thereto and the temperature maintained equal to or higher than 500° C. and lower than 800° C., to obtain a composite material from the mixed powder. The composite materials thus obtained in Examples 13 to 16 had a higher thermal conductivity than that of all of those obtained in Comparative examples 1 to 4.

The Cu-diamond MMC of Example 13 had a higher thermal conductivity than that of both of Examples 3 and 5. This result shows that a Cu-diamond MMC obtained by cyclic pressurization has a higher thermal conductivity than that of a Cu-diamond MMC obtained by continuous pressurization.

The Cu-diamond MMC of Example 14 had a higher thermal conductivity than that of Example 9. This result shows that in the case in which diamond is in the form of a bimodal mixed powder, a Cu-diamond MMC obtained by cyclic pressurization also has a higher thermal conductivity than that of a Cu-diamond MMC obtained by continuous pressurization.

The Cu-diamond MMC of Example 14 had a higher thermal conductivity than that of Example 16.

Figure 10:
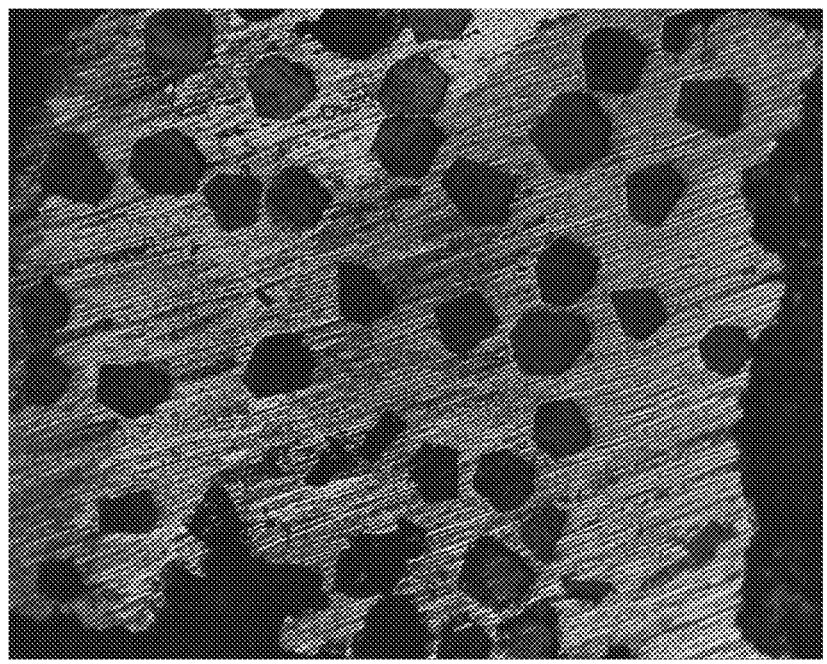
FIG. 10 is a microscopic photograph of a cross-section of a portion of a composite material in Example 5.
Figure 11:
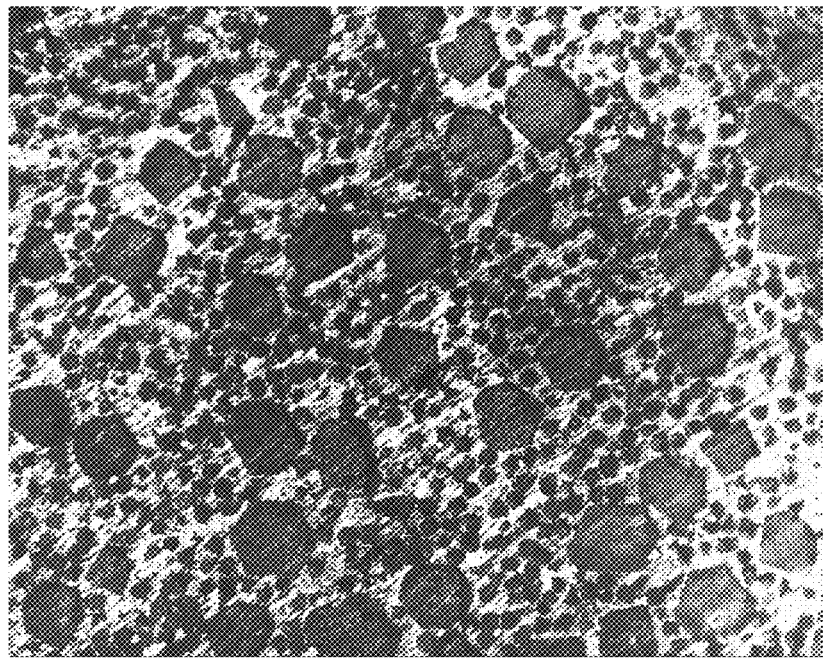
FIG. 11 is a microscopic photograph of a cross-section of a portion of a composite material in Example 14.

FIG. 10 is an optical microscopic photograph of a cross-section of a portion of a composite material produced in a manner similar to that of Example 5 of Table 1. FIG. 11 is an optical microscopic photograph of a cross-section of a portion of a composite material produced in a manner similar to that of Example 14 of Table 2. In each photograph, a region having a relatively high lightness corresponds to a portion where Cu is present, and a region having a relatively low lightness corresponds to diamond particles. In the composite material of FIG. 11, relatively small diamond particles having an average particle size of 60 μm are located in spaces between relatively large diamond particles having an average particle size of 250 μm. Compared to the composite material of FIG. 10, the composite material of FIG. 11 contains an increased number of diamond particles and an increased total area of the surfaces thereof. This indicates an increase in interface area between Cu and diamond. The increase in interface area may cause an increase in gaps and thermal resistance in a portion where adhesion is poor, likely leading to a decrease in thermal conductivity. However, in this example, such a phenomenon was not observed.

As can be seen from FIGS. 10 and 11, the composite materials of the above examples are dense.

APPLICATION EXAMPLES

Embodiments of the method of producing a composite material of the present disclosure provide a composite material that is applicable as various heat dissipation members. An example configuration of a light emitting device including a heat dissipation substrate employing a composite material produced in this example will be described.

Figure 12:
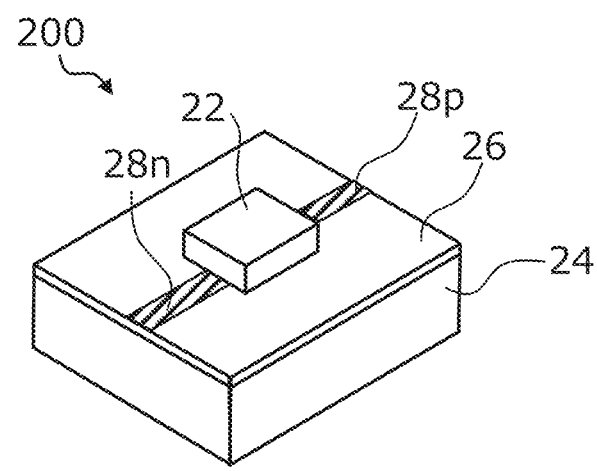
FIG. 12 is a perspective view schematically showing an example application of a composite material.

FIG. 12 is a perspective view schematically showing an example configuration of a light emitting device 200 including a flip-chip light-emitting element 22 and a heat dissipation substrate 24 supporting the light-emitting element 22. The heat dissipation substrate 24 is formed from a composite material produced using the production method of the embodiments described above. An insulating layer 26 of, for example, aluminum nitride (AlN), which is a ceramic, is disposed on an upper surface of the heat dissipation substrate 24. A positive interconnect 28p and a negative interconnect 28n are disposed on the insulating layer 26, and are electrically connected to a positive electrode and a negative electrode, respectively, of the light-emitting element 22. A lower surface of the heat dissipation substrate 24 is in thermal contact with a heat sink or cooling device (not shown). Heat generated in the light-emitting element 22 during operation spreads through the insulating layer 26, and thereafter, quickly dissipates out through the heat dissipation substrate 24.

The example configuration of the light emitting device 200 described above is an example of a semiconductor device in which a composite material according to an embodiment of the present disclosure is used as a heat dissipation member. The composite material can be used in other various applications.

INDUSTRIAL APPLICABILITY

The method of producing a composite material of the present disclosure provides a composite material that is applicable as various heat dissipation members. Examples of heat dissipation members include heat dissipation substrates, submounts, heat spreaders, packages, and heat sinks, which are brought into thermal contact with elements such as semiconductor light emitting devices, semiconductor integrated circuit devices, and monolithic microwave integrated circuit devices.

REFERENCE SIGNS LIST 10 diamond particle
20 cavity
30 die
40 upper punch
50 lower punch
60 power supply unit (power)
100 sintering device

The invention claimed is:

1. A method of producing a composite material, the method comprising:
preparing a mixed powder of diamond particles and copper powder particles; and
generating a composite material containing diamond and copper from the mixed powder by pulsed electric current sintering with repeated application of a first pressure and a second pressure higher than the first pressure, each of the first pressure and the second pressure being 5 MPa or greater and 100 MPa or less applied to the mixed powder, and with the mixed powder maintained at a temperature equal to or higher than 500° C. and lower than 800° C.

2. The method according to claim 1, wherein:
an amount of metals other than copper in the mixed powder is 1% or less in mass fraction.

3. The method according to claim 2, wherein:
the diamond particles in the mixed powder comprise particles having an average particle size of 200 μm or greater and 400 μm or less, and particles having an average particle size of 40 μm or greater and 80 μm or less.

4. The method according to claim 1, wherein:
in the step of preparing the mixed powder, the diamond particle is not covered with a metal layer.

5. The method according to claim 1, wherein:
a mass fraction of the copper powder particles in the mixed powder is 60% or greater and 85% or less, and
a mass fraction of the diamond particles in the mixed powder is 15% or greater and 40% or less.

6. The method according to claim 1, wherein:
the diamond particles in the mixed powder have an average particle size of 200 μm or greater and 400 μm or less.

7. The method according to claim 1, wherein:
the diamond particles in the mixed powder comprise particles having an average particle size of 200 μm or greater and 400 μm or less, and particles having an average particle size of 40 μm or greater and 80 μm or less.

8. The method according to claim 1, wherein:
the temperature is 500° C. or greater and 750° C. or less.

9. The method according to claim 1, wherein:
the first pressure is equal to or more than 5 MPa and less than 20 MPa, and the second pressure is equal to or more than 20 MPa and less than or equal to 40 MPa.

10. The method according to claim 1, wherein:
the diamond particles in the mixed powder have an average particle size of 40 μm or greater and 500 μm or less.

11. The method according to claim 1, wherein:
the first pressure is equal to or more than 5 MPa and less than 60 MPa, and the second pressure is equal to or more than 20 MPa and less than or equal to 100 MPa.

12. A method of producing a composite material, the method comprising:
preparing a mixed powder of diamond particles and copper powder particles; and
generating a composite material containing diamond and copper from the mixed powder by pulsed electric current sintering with repeated application of a first pressure and a second pressure higher than the first pressure, each of the first pressure and the second pressure being 5 MPa or greater and 100 MPa or less applied to the mixed powder, and with the mixed powder maintained at a temperature equal to or higher than 500° C. and lower than 800° C., wherein:
an amount of metals other than copper in the mixed powder is 1% or less in mass fraction,
the diamond particles in the mixed powder have an average particle size of 40 μm or greater and 500 μm or less.

13. The method according to claim 12, wherein:
in the step of preparing the mixed powder, the diamond particle is not covered with a metal layer.

14. The method according to claim 12, wherein:
a mass fraction of the copper powder particles in the mixed powder is 60% or greater and 85% or less, and
a mass fraction of the diamond particles in the mixed powder is 15% or greater and 40% or less.

15. The method according to claim 12, wherein:
the diamond particles in the mixed powder have an average particle size of 200 μm or greater and 400 μm or less.

16. The method according to claim 12, wherein:
the diamond particles in the mixed powder comprise particles having an average particle size of 200 μm or greater and 400 μm or less, and particles having an average particle size of 40 μm or greater and 80 μm or less.

17. The method according to claim 12, wherein:
the temperature is 500° C. or greater and 750° C. or less.

18. The method according to claim 12, wherein:
the first pressure and the second pressure are 10 MPa or greater and 90 MPa or less.

19. The method according to claim 12, wherein:
the first pressure is equal to or more than 5 MPa and less than 20 MPa, and the second pressure is equal to or more than 20 MPa and less than or equal to 40 MPa.

20. The method according to claim 12, wherein:
the copper powder particles have an average particle size of 3 μm or greater and 10 μm or less.

* * * * *